United States Patent
Hosono et al.

(10) Patent No.: US 9,150,423 B2
(45) Date of Patent: Oct. 6, 2015

(54) AMMONIA SYNTHESIS CATALYST AND AMMONIA SYNTHESIS METHOD

(75) Inventors: Hideo Hosono, Tokyo (JP); Michikazu Hara, Tokyo (JP); Masaaki Kitano, Tokyo (JP); Sung Wng Kim, Tokyo (JP); Satoru Matsuishi, Tokyo (JP); Yoshitake Toda, Tokyo (JP); Toshiharu Yokoyama, Tokyo (JP); Fumitaka Hayashi, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 259 days.

(21) Appl. No.: 13/824,227

(22) PCT Filed: Dec. 6, 2011

(86) PCT No.: PCT/JP2011/078132
§ 371 (c)(1),
(2), (4) Date: Mar. 15, 2013

(87) PCT Pub. No.: WO2012/077658
PCT Pub. Date: Jun. 14, 2012

(65) Prior Publication Data
US 2013/0183224 A1 Jul. 18, 2013

(30) Foreign Application Priority Data
Dec. 7, 2010 (JP) .................................. 2010-272976

(51) Int. Cl.
*C01C 1/04* (2006.01)
*B01J 35/00* (2006.01)
(Continued)

(52) U.S. Cl.
CPC ............. *C01C 1/0411* (2013.01); *B01J 23/462* (2013.01); *B01J 23/745* (2013.01); *B01J 23/75* (2013.01);
(Continued)

(58) Field of Classification Search
CPC .. C01C 1/0411; B01J 35/1009; B01J 37/0201; B01J 23/75; B01J 37/086; B01J 37/18; B01J 23/745; B01J 23/462; B01J 37/16; B01J 35/0033; B01J 35/002; B01J 21/04
USPC ...................................... 502/330, 1; 423/363
See application file for complete search history.

(56) References Cited

U.S. PATENT DOCUMENTS

| | | | |
|---|---|---|---|
| 4,654,320 | A | 3/1987 | Jennings |
| 4,668,657 | A | 5/1987 | Jennings |

FOREIGN PATENT DOCUMENTS

| | | |
|---|---|---|
| GB | 127063 | 5/1919 |
| JP | 51-47674 | 12/1976 |

(Continued)

OTHER PUBLICATIONS

Li et al. "Development of new nickel based catalyst for biomass tar steam reforming producing H2-rich syngas" Fuel Processing Technology, vol. 90, Issue 6, Jun. 2009, pp. 790-796.*

(Continued)

*Primary Examiner* — Colleen Dunn
*Assistant Examiner* — Haytham Soliman
(74) *Attorney, Agent, or Firm* — Westerman, Hattori, Daniels & Adrian, LLP (57) ABSTRACT

The present invention provides a catalyst substance that is stable and performs well in the synthesis of ammonia, one of the most important chemical substances for fertilizer ingredients and the like. The catalyst substance exhibits catalytic activity under mild synthesis conditions not requiring high pressure, and is also advantageous from a resource perspective. Further provided is a method for producing the same. This catalyst comprises a supported metal catalyst that is supported on a mayenite type compound including conduction electrons of $10^{15}$ cm$^{-3}$ or more and serving as a support for the ammonia synthesis catalyst. The mayenite type compound used as the support may take any form, including that of powder, a porous material, a sintered body, a thin-film, or a single crystal. Use of this catalyst makes it possible to increase the electron donating ability toward a transition metal.

4 Claims, 1 Drawing Sheet (51) Int. Cl.

| | |
|---|---|
| B01J 37/08 | (2006.01) |
| B01J 37/16 | (2006.01) |
| B01J 37/18 | (2006.01) |
| B01J 23/46 | (2006.01) |
| B01J 23/745 | (2006.01) |
| B01J 23/75 | (2006.01) |
| B01J 35/10 | (2006.01) |
| B01J 37/02 | (2006.01) |
| B01J 21/04 | (2006.01) |

(52) U.S. Cl.
CPC ............ *B01J 35/002* (2013.01); *B01J 35/0033* (2013.01); *B01J 35/1009* (2013.01); *B01J 37/0201* (2013.01); *B01J 37/086* (2013.01); *B01J 37/16* (2013.01); *B01J 37/18* (2013.01); *B01J 21/04* (2013.01)

(56) References Cited

FOREIGN PATENT DOCUMENTS

| | | |
|---|---|---|
| JP | 54-37592 B1 | 11/1979 |
| JP | 59-16816 B2 | 4/1984 |
| JP | 2-258066 A | 10/1990 |
| JP | 9-239272 A | 9/1997 |
| JP | 2000-264625 A | 9/2000 |
| JP | 2001-151507 A | 6/2001 |
| JP | 2003-128415 A | 5/2003 |
| JP | 2003-190787 A | 7/2003 |
| JP | 2004-35399 A | 2/2004 |
| JP | 2005-314196 A | 11/2005 |
| JP | 2006-231229 A | 9/2006 |
| JP | 2007-137684 A | 6/2007 |
| JP | 2008-13435 A | 1/2008 |
| JP | 2008-214302 A | 9/2008 |
| JP | 2009-203126 A | 9/2009 |
| JP | 2009-208987 A | 9/2009 |
| WO | 96/38222 A1 | 12/1996 |
| WO | 2005/000741 A1 | 1/2005 |
| WO | 2007/060890 A1 | 5/2007 |

OTHER PUBLICATIONS

Kim et al. "Metallic State in a Lime—Alumina Compound with Nanoporous Structure" Nano Lett., 2007, 7 (5), pp. 1138-1143.*
Virginie et al. "Toluene steam reforming as tar model molecule produced during biomass gasification with an iron/olivine catalyst" Comptes Rendus Chimie, vol. 13, Issue 10, Oct. 2010, pp. 1319-1325.*
Bartl et al., "Zur Struktur des 12CaO-7Al2O3", Mineral Monatch, pp. 547-553, 1970.
S. Matsuishi et al., "High-Density Electron Anions in a Nanoporous Single Crystal: [Ca24Al28O64]4+(4e)", Science, vol. 301, pp. 626-629, 2003.
Matsuishi et al., "Direct Synthesis of Powdery Inorganic Electride [CA24A128O64]4+(e")4 and Determination of Oxygen Stoichiometry", Chemistry of Materials, vol. 21, pp. 2589-2591, 2009.
International Search Report dated Feb. 7, 2012, issued in corresponding application No. PCT/JP2011/078132.
European Office Action dated Jul. 14, 2014, issued in corresponding European Application No. 11847578.9.
Strandbakke, R. et al., "High-Temperature Hydration and Conductivity of Mayenite, Ca12Al14O33", J. Phys. Chem. C, 2009, 113, pp. 8938-8944.
Mittasch, A., "Early Studies of Multicomponent Catalysts", Adv. Catal. 2, pp. 81-104, (1950).
Honkala, K. et al. "Ammonia Synthesis from First-Principles Calculations", Science, vol. 307, pp. 555-558, Jan. 28, 2005.
Ertl, G., "Elementary Steps in Heterogeneous Catalysis", Angew. Chem. Int. Ed. Engl. 29, pp. 1219-1227, (1990).
Gambarotta, S. et al., "Multimetallic Cooperative Activation of N2", Angew. Chem. Int. Ed. 43, pp. 5298-5308 (2004).
Pool, J. A. et al., "Hydrogenation and cleavage of dinitrogen to ammonia with a zirconium complex", Nature, vol. 427, Feb. 5, 2004, pp. 527-530.
Spencer, N. D. et al., "Structure sensitivity in the iron single-crystal catalysed synthesis of ammonia", Nature, vol. 294, Dec. 17, 1981, pp. 643-644.
Aika, K. et al., "Preparation and Characterization of Chlorine-Free Ruthenium Catalysts and the Promoter Effect in Ammonia Synthesis", 3. A Magnesia-Supported Ruthenium Catalyst, J. Catal. 136, pp. 126-140, (1992).
Jacobsen, C. J. H. et al., Catalyst Design by Interpolation in the Periodic Table: Bimetallic Ammonia Synthesis Catalysts, J. Am. Chem. Soc. 123, pp. 8404-8405, (2001).
Ozaki, A. "Development of Alkali-Promoted Ruthenium as a Novel Catalyst for Ammonia Synthesis", Acc. Chem. Res. 14, pp. 16-21, (1981).
Tsai, M. C. et al., "A Vibrational Spectroscopy Study on the Interaction of N2 With Clean and K-Promoted Fe(111) Surfaces: π-Bonded Dinitrogen as Precursor for Dissociation", Surf. Sci. 155, pp. 387-399, (1985).
Rosowski, F. et al., "Ruthenium catalysts for ammonia synthesis at high pressures: Preparation, characterization, and power-law kinetics", Appl. Catal. A: General 151, pp. 443-460, (1997).
Bielawa, H. et al.,"The Ammonia-Synthesis Catalyst of the Next Generation: Barium-Promoted Oxide-Supported Ruthenium", Angew. Chem. Int. Ed. 40, No. 6, pp. 1061-1063, (2001).
Rao, C.N.R. et al.,"Nature of nitrogen adsorbed on transition metal surfaces as revealed by electron spectroscopy and cognate techniques", Surf. Sci. Rep. 13, pp. 221-263, (1991).
Aika, K. et al., "Activation of Nitrogen by Alkali-Metal Promoted Transition Metal I. Ammonia Synthesis over Ruthenium Promoted by Alkali-Metal", J. Catal. 27, pp. 424-431, (1972).
Hansen, T. W. et al., "Atomic-Resolution in Situ Transmission Electron Microscopy of a Promoter of a Heterogeneous Catalyst", Science, vol. 294, Nov. 16, 2001, pp. 1508-1510, (2001).
Ertl, G., "Reactions at Surfaces: From Atoms to Complexity (Nobel Lecture)", Angew. Chem. Int. Ed. 47, pp. 3524-3535, (2008).
Urabe, K. et al., "Activation of Nitrogen by Alkali Metal-Promoted Transition Metal", J. Catal. 38, pp. 430-434, (1975).
Ommen, J. G. V. et al., "The Nature of the Potassium Compound Acting as a Promoter in Iron-Alumina Catalysts for Ammonia Synthesis", J. Catal. 38, pp. 120-127, (1975).
Larichev, Y. V. et al., "XPS and TEM Studies on the Role of the Support and Alkali Promoter in Ru/MgO and Ru-Cs+/MgO Catalysts for Ammonia Synthesis", J. Phys. Chem. C, 111, pp. 9427-9436 (2007).
Siporin, S. E. et al.,"Use of kinetic models to explore the role of base promoters on Ru/MgO ammonia synthesis catalysts", J. Catal, 225, pp. 359-368, (2004).
Bècue, T. et al., "Effect of Cationic Promoters on the Kinetics of Ammonia Synthesis Catalyzed by Ruthenium Supported on Zeolite X", J. Catal. 179, pp. 129-137, (1998).
Dye, J. L., "Electrides: Early Examples of Quantum Confinement", Acc. Chem. Res. vol. 42, No. 10, pp. 1564-1572, Oct. 2009.
Sushko, P. V. et al., "Electron Localization and a Confined Electron Gas in Nanoporous Inorganic Electrides", Phys. Rev. Lett. Vo. 91, No. 12, pp. 126401-1-126041-4 (2003).
Yoon, B. et al., "Charging Effects on Bonding and Catalyzed Oxidation of CO on Au8 Clusters on MgO", Science, vol. 307, pp. 403-407, Jan. 21, 2005.
Ricci, D. et al., "Paramagnetic Defect Centers at the MgO Surface. An Alternative Model to Oxygen Vacancies", J. Am. Chem. Soc. 125, pp. 738-747 (2003).
Sushko, P. V. et al., "Electronic Properties of Structural Defects at the MgO (001) Surface", J. Phys. Chem. B, 106, pp. 2269-2276 (2002).
Toda, Y. et al., "Work Function of a Room-Temperature, Stable Electride [Ca24Al28O64]4+(e**]", Adv. Mater. 19, pp. 3564-3569, (2007).
Michaelson, H. B., "The work function of the elements and its periodicity", J. Appl. Phys. 48, No. 11, pp. 4729-4733, (Nov. 1977).

(56) References Cited

OTHER PUBLICATIONS

Liang, C. et al., "Ammonia synthesis over Ru/C catalysts with different carbon supports promoted by barium and potassium compounds", Appl. Catal. A: General, 208, pp. 193-201, (2001).

Kowalczyk, Z. et al., "Carbon-supported ruthenium catalyst for the synthesis of ammonia. The effect of the carbon support and barium promoter on the performance", Appl. Catal. A: General, 184, pp. 95-102, (1999).

Raróg-Pilecka, W. et al., "Carbon-supported ruthenium catalysts for NH3 synthesis doped with caesium nitrate: Activation process, working state of Cs-Ru/C", J. Catal. 239, pp. 313-325, (2006).

Kadowaki, Y. et al., "Promoter Effect of Sm2O3 on Ru/Al2O3 in Ammonia Synthesis", J. Catal. 161, pp. 178-185, (1996).

Kubota, J. et al., "Infrared Spectra of Adsorbed Dinitrogen on Ruthenium Metal Supported on Alumina and Magnesium Oxide", J. Chem. Soc. Chem. Commun. pp. 1544-1545, (1991).

Kubota, J. et al., "Infrared Studies of Adsorbed Dinitrogen on Supported Ruthenium Catalysts for Ammonia Synthesis: Effects of the Alumina and Magnesia Supports and the Cesium Compound Promoter", J. Phys. Chem. 98, pp. 11293-11300, (1994).

You, Z. et al., "Electronic and structural promotion of barium hexaaluminate as a ruthenium catalyst support for ammonia synthesis", J. Catal. 251, pp. 321-331, (2007).

Aika, K. et al., "Support and Promoter Effect of Ruthenium Catalyst. III. Kinetics of Ammonia Synthesis Over Various Ru Catalysts", Appl. Catal. A, 28, Elsevier Science Publishers B.V., Amsterdam, pp. 57-68, (1986).

Hagen, S. et al., "Ammonia synthesis with barium-promoted iron-cobalt alloys supported on carbon", J. Catal. 214, pp. 327-335, (2003).

Kitano et al., "Ammonia synthesis using a stable electride as an electron donor and reversible hydrogen store", Nature Chemistry, vol. 4, pp. 934-940, (Nov. 2012).

\* cited by examiner

AMMONIA SYNTHESIS CATALYST AND AMMONIA SYNTHESIS METHOD

TECHNICAL FIELD

The present invention relates to an ammonia synthesis catalyst suitable for synthesizing ammonia through a reaction of hydrogen and nitrogen, to a method for producing the ammonia synthesis catalyst, and to an ammonia synthesis method using the ammonia synthesis catalyst.

BACKGROUND ART

Artificial fertilizers (ammonium sulfate and urea fertilizer), which are inevitable in producing crops to support continued existence of the human race, are produced from ammonia. A technique for synthesizing ammonia by employing nitrogen and hydrogen as starting materials and by utilizing a catalyst made of primarily iron was discovered by Haber and Bosch. That technique (called a "Haber-Bosch process") has been used as an essential technique to support the life of humankind up to now even after the lapse of about one century since the Haber-Bosch process was industrially completed in 1910's.

The Haber-Bosch process includes a step of direct reaction of a gas mixture of nitrogen and hydrogen to perform a reaction under high-temperature and high-pressure conditions of 400 to 600° C. and about 20 MPa to about 100 MPa by utilizing a doubly promoted iron catalyst, which is primarily made of $Fe_3O_4$ containing several weight percent of $Al_2O_3$ and $K_2O$, and a step of separating ammonia produced through the reaction of $N_2+3H_2 \rightarrow 2NH_3$ by cooling the produced ammonia or absorbing the same with water. Even at present, such a technique is industrially used in a production process substantially in the same manner as that when it was initially completed.

On the other hand, there is a known catalyst using, as a transition metal element having ammonia synthesis activity at low temperature of 300° C. or below, one kind of elements selected from among Mo, W, Re, Fe, Co, Ru, and Os, or any one of combinations of Fe and Ru, Ru and Re, and Fe and Mo substantially in a metallic state (Patent Literature (PTL) 1). Ammonia synthesis methods using, as a catalyst, any of group 8 or 9 transition metals, e.g., Fe, Ru, Os and Co, have also been developed (PTLs 2 to 4). Methods using, particularly, ruthenium as a catalyst for ammonia synthesis have further been developed (PTLs 5 to 8). Moreover, ammonia synthesis methods using, as a catalyst, any of nitrides of group 8 or 6B transition metals and composite nitrides of Co and Mo, have been developed (PTLs 9 and 10).

In addition, a method of producing ammonia from nitrogen and water vapor through plasma contact by employing a catalyst containing, in a support material, a component that has catalytic activity and that is selected as at least one transition metal from a group consisting of Ti, Zr, Hf, V, Nb, Ta, Cr, Mo, W, Fe, Ru, Os, Co, Rh, Ir, Ni, Pd, Pt, Mn, and Cu, is filed for a patent application (PTL 11).

Hitherto, in order to utilize an ammonia synthesis catalyst, e.g., Ru or Fe, with high efficiency, magnesia, alumina, graphite, ceria, etc. have been used as catalyst supports, and alkali metals, alkali metal compounds, alkaline earth metal compounds, etc. have been used as promoters.

When an acidic compound, e.g., alumina, is employed as the support, it has usually been required to add a large amount of compound, which serves as a promoter having a high electro-negativity, for the purpose of increasing an electron donating ability and providing a catalyst with high activity.

Meanwhile, there is a chemical compound, having a mineral name of "mayenite", among calcium aluminosilicates containing CaO, $Al_2O_3$ and $SiO_2$ as ingredients. A compound having the same type of crystal structure as a crystal of the mayenite is called a "mayenite type compound". The mayenite type compound has a representative composition of $12CaO·7Al_2O_3$ (hereinafter denoted by "C12A7"). It is reported that a C12A7 crystal has a unique crystal structure where two of 66 oxygen ions present in a unit cell, containing two molecules, are included as "free oxygen ions" in a space within a cage, which forms the framework structure of C12A7 (Non Patent Literature (NPL) 1).

After 2003, the inventors have clarified that those free oxygen ions can be replaced with various anions. In particular, all of the free oxygen ions can be replaced with electrons by holding C12A7 in a strong reducing atmosphere. C12A7 in which the free oxygen ions are replaced with electrons can be expressed by a chemical formula of $[Ca_{24}Al_{28}O_{64}]^{4+}(e^-)_4$ (hereinafter denoted by $[C12A7:e^-]$). A substance containing electrons substituted for anions as described above is called an electride, and the electride is featured in having a good electrical conductivity (NPL 2).

Furthermore, the inventors have found $C12A7:e^-$ that is an electronic conducting mayenite type compound, $12SrO·7Al_2O_3$ that is a compound being of the same type as C12A7, a mixed crystal compound of C12A7 and $12SrO·7Al_2O_3$, and a synthesis method thereof (PTL 12). An invention regarding a mayenite type compound in which Al is partly replaced with Ga or In is also filed for a patent application (PTL 16). Such a mayenite type compound is suitable as electrode materials requiring high-temperature heat treatment, e.g., a PDP protective film material and a charge electron injection material in an organic EL device. The inventors have further found that $C12A7:e^-$ containing conduction electrons at a concentration of $1\times10^{19}/cm^3$ or more and a compound being of the same type as C12A7 can be obtained by (A) a method of annealing a C12A7 single crystal at high temperature in vapor of an alkali metal or a alkaline earth metal, (B) a method of ion-implanting inactive ions into a C12A7 single crystal, or (C) a method of direct solidification from a melt of a C12A7 single crystal in a reducing atmosphere (PTL 13).

Moreover, the inventors have succeeded in obtaining $C12A7:e^-$, which exhibits metallic electrical conductivity, by annealing a C12A7 single crystal in vapor of titanium metal (Ti), and have filed inventions regarding a production method of the $C12A7:e^-$ and usage thereof as an electron emission material for a patent application (PTL 14). The $C12A7:e^-$ exhibiting metallic electrical conductivity can also be directly synthesized in the form of powder by mixing $CaCO_3$ and $Al_2O_3$ at a ratio of 11:7, heating the mixture at 1300° C., and further heating an obtained product in a vapor atmosphere of metallic Ca (NPL 3).

Since electrons included in $C12A7:e^-$ are loosely trapped within a cage of a positively charged framework structure, those electrons can be taken out to the exterior by applying a voltage or by employing chemical methods. On the basis of an idea that those electrons taken out to the exterior can be used in reductive reaction, the inventors have invented a method of producing secondary alcohol and diketone compounds by reducing ketone compounds by the electrons included in $C12A7:e^-$ and have filed the method for a patent application (PTL 15).

CITATION LIST

Patent Literature

PTL 1: Japanese Examined Patent Application Publication No. 51-47674
PTL 2: Japanese Examined Patent Application Publication No. 54-37592
PTL 3: Japanese Examined Patent Application Publication No. 59-16816
PTL 4: International Publication WO96/38222
PTL 5: Japanese Unexamined Patent Application Publication No. 2-258066
PTL 6: Japanese Unexamined Patent Application Publication No. 9-239272
PTL 7: Japanese Unexamined Patent Application Publication No. 2004-35399
PTL 8: Japanese Unexamined Patent Application Publication No. 2006-231229
PTL 9: Japanese Unexamined Patent Application Publication No. 2000-264625
PTL 10: Japanese Unexamined Patent Application Publication No. 2008-13435
PTL 11: Japanese Unexamined Patent Application Publication No. 2001-151507
PTL 12: Domestic Re-Publication of PCT International Publication for Patent Application No. 2005/000741
PTL 13: Japanese Unexamined Patent Application Publication No. 2005-314196
PTL 14: Domestic Re-Publication of PCT International Publication for Patent Application No. 2007/060890
PTL 15: Japanese Unexamined Patent Application Publication No. 2008-214302
PTL 16: Japanese Unexamined Patent Application Publication No. 2009-203126

Non Patent Literature

NPL 1: H. Bartl, T. Scheller, "Neues Jahrbuch Fur" Mineralogie Monashefte, 35, 547-552, (1970)
NPL 2: S. Matsuishi, Y. Toda, M. Miayakawa, K. Hayashi, T. Kamiya, M. Hirano, I. Tanaka and H. Hosono, "Science", 301, 626-629, (2003)
NPL 3: S. Matsuishi, T. Nomura, M. Hirano, K. Kodama, S. Shamoto and H. Hosono, "Chemistry of Materials", 21, 2589-2591, (2009)

SUMMARY OF INVENTION

Technical Problem

Because the Haber-Bosch process is a volume reduction reaction, it is advantageous to develop the reaction under high pressure of about 20 MPa or higher from the viewpoint of increasing reaction efficiency. Furthermore, the Haber-Bosch process is required to develop the reaction at high temperature in order to obtain activity of a catalyst primarily made of Fe. Accordingly, the Haber-Bosch process has drawbacks that the size of a synthesis apparatus is increased, and that a loss of thermal energy is large. In addition, an existing ammonia production technique is disadvantageous in that, because a one-pass conversion level is low, unreacted gas has to be recycled and an amount of energy used for the recycle is increased.

Meanwhile, it is known that when Ru is used as an ammonia synthesis catalyst, the reaction progresses at low pressure. Thus, Ru receives attention as a second-generation ammonia synthesis catalyst. However, a catalytic performance of Ru alone is very small, and a support or a promoter compound needs to be used to develop the catalytic ability of Ru. Recently, a promoted Ru catalyst supported on carbon has been brought into a commercial process. Although such a Ru catalyst has high activity, it is known that, because methane is generated with a reaction of the support and hydrogen under ammonia synthesis conditions, the support loses its function, thus causing a serious problem in process operations. For that reason, the development of a stable catalyst has been demanded, taking into account the industrial ammonia synthesis conditions.

An object of the present invention is to provide a catalyst substance that is stable and performs well in the synthesis of ammonia, one of the most important chemical substances for fertilizer ingredients and the like, the catalyst substance exhibiting catalytic activity under mild synthesis conditions not requiring high pressure, and being also advantageous from a resource perspective. Other objects of the present invention are to provide a method for producing the catalyst compound and an ammonia synthesis method using the catalyst compound.

Solution to Problem

As a result of conducting intensive studies with intent to achieve the above-mentioned objects, the inventors have found that ammonia synthesis activity is drastically increased by forming a supported metal catalyst with a transition metal, e.g., Ru or Fe, supported on a mayenite type compound containing conduction electrons, and that an ammonia synthesis catalyst being stable even in a reaction for a long time and exhibiting much higher performance than conventional catalysts is obtained without using any of unstable alkali metals, alkaline earth metals, and compounds thereof as promoter compounds.

The present invention is concerned with an ammonia synthesis catalyst comprising a supported metal catalyst that is supported on a mayenite type compound including conduction electrons of $10^{15}$ cm$^{-3}$ or more and serving as a support for the ammonia synthesis catalyst.

In the mayenite type compound, oxide ions ($O_2^-$ and $O_2^{2-}$) included in a cage structure are replaced with electrons, which serve as conduction electrons. C12A7 containing those conduction electrons is expressed by a composition formula of $([Ca_{24}Al_{28}O_{64}]^{4+}(O^{2-})_{2-x}(e)_{2x})$ (0<x≤2). By replacing the oxide ions with electrons, the conduction electrons of $1\times10^{15}$ cm$^{-3}$ or more can be included in the mayenite type compound. Thus, the mayenite type compound including the conduction electrons can be called an "electrical conducting mayenite type compound". A theoretically maximum concentration of the conduction electrons is $2.3\times10^{21}$ cm$^{-3}$ in the case of C12A7. The mayenite type compound including the conduction electrons at a concentration equal to the theoretical value can be obtained with the above-described method.

C12A7 has the catalytic performance even when it includes no conduction electrons. In order to obtain higher ammonia synthesis activity than conventional catalysts, however, the mayenite type compound is required to include conduction electrons of $10^{15}$ cm$^{-3}$ or more in the catalyst of the present invention. The mayenite type compound including a larger amount of conduction electrons provides higher ammonia synthesis efficiency. In the catalyst of the present invention, the mayenite type compound preferably includes the conduction electrons of $10^{17}$ cm$^{-3}$ or more and more preferably includes the conduction electrons of $10^{18}$ cm$^{-3}$ or more.

The mayenite type compound exhibits optical absorption peaking at 2.8 eV and 0.4 eV. A conduction electron density is obtained by measuring the optical absorption coefficient. The conduction electron density can be simply obtained by a diffuse reflection method when a sample is in the form of powder. Because conduction electrons within a cage have spin activity, a conduction electron density within the cage can also be measured by utilizing electron spin resonance (ESR). Moreover, the mayenite type compound including the conduction electrons reduces iodine when the mayenite type compound is dissolved in a solution containing iodine. By utilizing such an action, a conduction electron density within the cage can further be measured by carrying out oxidation-reduction titration.

The supported metal catalyst can be produced by one of an impregnation process, a physical mixing process, a thermal decomposition process, a liquid phase process, and a vapor deposition process. Preferably, the supported metal catalyst is produced through the steps of dispersing powder of the mayenite type compound, including conduction electrons of $10^{15}$ cm$^{-3}$ or more, in a solvent solution of a transition metal compound, evaporating a solvent of the solvent solution, and heating a catalyst precursor made of the dried transition metal compound in a reducing atmosphere, thereby forming a catalytic metal through reduction of the transition metal compound. Ammonia can be synthesized with high efficiency by employing the catalyst produced as described above, and by reacting nitrogen and hydrogen as starting materials on the catalyst in a reaction apparatus under conditions of reaction temperature from 100° C. to 600° C. or below and reaction pressure of 10 kPa to 30 MPa.

[Definition of Mayenite Type Compound]

In the present invention, the term "mayenite type compound" implies mayenite itself in the form of a mineral, a mayenite type rock, and a mixed oxide having the same crystal structure as that of a mayenite in the form of a mineral. A crystal of the mayenite type compound is constructed such that cage-shaped structures (called "cages") having an inner diameter of about 0.4 nm share their wall surfaces and are three-dimensionally connected to each other. Anions, such as $O^{2-}$, are usually included within each cage of the mayenite type compound, but those anions can be replaced with conduction electrons by annealing. A concentration of conduction electrons in the mayenite type compound is increased by prolonging an annealing time.

A representative composition of the electrical conducting mayenite type compound is expressed by a formula of $[Ca_{24}Al_{28}O_{64}]^{4+}(O^{2-})_{2-x}(e^{-})_{2x}$ (0<x≤2). The electrical conducting mayenite type compound can be obtained, for example, by annealing C12A7, which has been produced with a sintering process, in metal vapor of, e.g., Ca or Ti, at about 1100° C. Various processes are known as methods for producing the electrical conducting mayenite type compound, and any compounds obtained using those processes can be optionally used in the present invention.

When the mayenite type compound is annealed in metal vapor of Ti, the mayenite type compound including conduction electrons at a theoretically maximum concentration ($2.3 \times 10^{21}$ cm$^{-3}$ in the case of C12A7) can be obtained by annealing for about 24 hours even with the use of a single-crystal mayenite type compound in a thickness of 3 mm. As an alternative, the mayenite type compound may be obtained by solidifying a melt of the mayenite type compound having the stoichiometric composition in a reducing atmosphere. A conduction electron concentration of the mayenite type compound obtained with the solidification in the reducing atmosphere is less than $10^{21}$ cm$^{-3}$.

The electrical conducting mayenite type compound can also be produced by ion-implanting Ar$^+$ ions at a high concentration into the mayenite type compound. A conduction electron concentration of the obtained electrical conducting mayenite type compound can be determined from the intensity of an optical absorption band (2.8 eV in the case of 12CaO.7Al$_2$O$_3$). When the conduction electron concentration of the electrical conducting mayenite type compound is small, the conduction electron concentration can also be determined from the intensity of an electron spin resonance absorption band.

In the electrical conducting mayenite type compound, Ca constituting the above-mentioned representative composition formula may be partly or entirely replaced with at least one or more typical metal elements or transition metal elements, which are selected from a group consisting of Li, Na, K, Mg, Sr, Ba, Sc, Ti, V, Cr, Mn, Fe, Co, Ni, Cu, Ir, Ru, Rh, and Pt. Furthermore, Al constituting the above-mentioned representative composition formula may be partly or entirely replaced with at least one or more typical metal elements or transition metal elements, which are selected from a group consisting of B, Ga, C, Si, Fe, and Ge. In addition, O constituting the above-mentioned representative composition formula may be partly or entirely replaced with at least one or more typical elements or metal elements, which are selected from a group consisting of H, F, Cl, Br and Au.

Advantageous Effects of Invention

According to the method of the present invention, ammonia can be synthesized through a reaction of hydrogen and nitrogen by employing an inexpensive and nontoxic compound made of only elements having Clarke numbers at relatively high ranks, such as calcium, aluminum, and oxygen, with not only less energy consumption under low reaction pressure of 10 kPa to 30 MPa, more preferably 10 kPa to 20 MPa, but also long-term stability at high efficiency because catalytic activity does not reduce with repetition of the synthesis reaction. Furthermore, transition metal elements, such as Fe and Co, other than expensive rare metals, such as Ru, can also be used as a supported metal catalyst. Hence the present invention is valuable from the viewpoint of effective use of resources. Moreover, because of no need of adding promoters, e.g., alkali metals, alkali metal compounds, and alkaline earth metal compounds unlike conventional supports made of alumina and so on, a production process is simplified.

DESCRIPTION OF EMBODIMENTS

A catalyst of the present invention, a method for producing the catalyst, and an ammonia synthesis method using the catalyst (hereinafter referred to as a "method of the present invention") will be described in detail below.

<Process of Including Conduction Electrons in Mayenite Type Compound>

The mayenite type compound used as a starting material in the catalyst production method of the present invention may take any form, including that of powder, porous material, a sintered body, a thin film, or single crystal. The mayenite type compound may also be a mayenite type compound deposited on a support made of another substance. A mayenite type compound including conduction electrons can be directly produced from raw materials without being temporarily produced as the ordinary mayenite type compound except for the case taking the form of a thin film or a single crystal. Moreover, mayenite type minerals, slug and incinerated ash each containing mayenite, etc. can be used as the raw materials.

Powder of the mayenite type compound including conduction electrons may be produced by heating raw material powder of the mayenite type compound, which has the stoichiometric composition, in a reducing atmosphere. A sintered body of the mayenite type compound including conduction electrons may be produced by heating raw material powder of the mayenite type compound, which has the stoichiometric composition, at about 1300° C. in a reducing atmosphere, thereby sintering and solidifying the same.

A thin film of the mayenite type compound including conduction electrons may be produced by employing, as a target, a sintered body of the mayenite type compound, forming a thin film of the mayenite type compound on a substrate made of, e.g., MgO or $Y_3Al_5O_{12}$ with pulse laser deposition (PLD), sputtering, or plasma spraying, for example, and by depositing a thin film of the mayenite type compound again with PLD to be integrated with the already deposited thin film while heating the latter at 500° C. or higher. When the PLD is repeated, the mayenite type compound brought into a plasma state serves as a reductant such that conduction electrons are included in the deposited thin film.

A single crystal of the mayenite type compound including conduction electrons may be produced by forming a single crystal of the mayenite type compound through a step of pulling a melt in which raw material powder of the mayenite type compound is melted at about 1600° C. (i.e., with the CZ process), sealing the formed single crystal in an evacuated glass tube together with, e.g., metal powder of Ca or Ti, and by heating them in a reducing atmosphere such that conduction electrons are included in the single crystal.

The electrical conducting mayenite type compound in the form of a sintered body or a single crystal can also be processed into powder. The powder processing can be performed, for example, by pulverization using a mortar or a jet mill. Although powder size is not limited to particular one, particles having particle diameters distributed over a range of about 100 nm to 1 mm are obtained with the above-mentioned powder processing. The mayenite type compound including conduction electrons of $1 \times 10^{15}$ $cm^{-3}$ or more is produced according to any of the methods described above.

Depending on the production method, conduction electrons may disappear from the surface of the mayenite type compound regardless of the mayenite type compound taking which one of the forms of powder, a porous material, a sintered body, a thin film, and a single crystal. In such a case, it is desired to heat the produced mayenite type compound at temperature of not lower than 900° C. and lower than the melting point (1250° C.) of the relevant compound in vacuum, an inert gas, or a reducing atmosphere such that the conduction electrons are included up to the outermost surface of the mayenite type compound.

<Step of Supporting Transition Metal>

Transition metal elements are used as catalysts for a homogeneous system and an inhomogeneous system in various synthesis reactions. In particular, it is known that transition metals belonging to groups 6, 8 and 9, such as Fe, Ru, Os, Co and Mo, are suitable as catalysts for synthesizing ammonia through a direct reaction of hydrogen and nitrogen. In the present invention, one or more group 6 metals selected from Cr, Mo and W, one or more group 7 metals selected from Mn, Tc and Re, one or more group 8 metals selected from Fe, Ru and Os, and one or more group 9 metals selected from Co, Rh and Ir can be used as the transition metal element(s) singly or in combination. In addition, compounds of the above-mentioned elements, e.g., $Co_3Mo_3N$, $Fe_3Mo_3N$, $Ni_2Mo_3N$, and $Mo_2N$, can also be used.

When powder or a porous material of the mayenite type compound is used as the support, the powder or the porous material of the mayenite type compound obtained with the above-described steps and including conduction electrons of $1 \times 10^{15}$ $cm^{-3}$ or more is mixed with a transition metal compound by an impregnation process or a physical mixing process. A sintered body, a thin film, a single crystal, etc. of the mayenite type compound is used, it is possible to employ, in addition to the impregnation process as in the case of the power or the porous material, a method of depositing the transition metal compound on the surface of the sintered body, the thin film, or the single crystal by, e.g., CVD (chemical vapor deposition) or sputtering, and thermally decomposing the deposited transition metal compound, thus causing a transition metal to be precipitated. When the transition metal compound is used, the compound can also be obtained, for example, by a method of depositing any of respective metal raw materials on the mayenite with, e.g., CVD, thermally decomposing the deposited material, and then nitriding it with ammonia gas.

Examples of the transition metal compound are, though not limited to particular ones, inorganic metal compounds and organic metal complexes, which are susceptible to thermal decomposition, including, e.g., triruthenium dodecacarbonyl $[Ru_3(CO)_{12}]$, dichlorotetrakis(triphenylphosphine)ruthenium(II) $[RuCl_2(PPh_3)_4]$, dichlorotris(triphenylphosphine)ruthenium(II) $[RuCl_2(PPh_3)_3]$, tris(acetylacetonato)ruthenium(III) $[Ru(acac)_3]$, ruthenocene $[Ru(C_5H_5)]$, ruthenium chloride $[RuCl_3]$, iron pentacarbonyl $[Fe(CO)_5]$, tetracarbonyliron(II) iodide $[Fe(CO)_4I_2]$, iron(III) chloride $[FeCl_3]$, ferrocene $[Fe(C_5H_5)_2]$, tris(acetylacetonato)iron(III) $[Fe(acac)_3]$, dodecacarbonyltriiron $[Fe_3(CO)_{12}]$, cobalt(III) chloride $[CoCl_3]$, tris(acetylacetonato)cobalt(III) $[Co(acac)_3]$, cobalt(II) acetylacetonate $[Co(acac)_2]$, cobalt octacarbonyl $[Co_2(CO)_8]$, cobaltcene $[Co(C_5H_5)_2]$, triosmium dodecacarbonyl $[Os_3(CO)_{12}]$, and molybdenum hexacarbonyl $[Mo(CO)_6]$.

The impregnation process can be practiced, for example, as follows. Catalyst support powder is dispersed and stirred in a solution of the transition metal compound (e.g., a hexane solution of a Ru carbonyl complex). At that time, the transition metal compound is loaded at 0.01 to 40 wt %, preferably 0.02 to 30 wt %, and more preferably 0.05 to 20 wt % with respect to the support powder. Thereafter, the solution is heated at 50 to 200° C. for 30 minutes to 5 hours in a flow of inert gas, e.g., nitrogen, argon or helium, or under vacuum to evaporate a solvent for dryness. A catalyst precursor made of the dried transition metal compound is then reduced. Through the steps described above, a supported metal catalyst is obtained in which the transition metal is supported as fine particles having particle diameters of several nm to several hundreds nm on the support powder.

A specific surface area of the supported metal catalyst is 0.1 to 100 m²/g, and an amount of the transition metal is 0.01 to 30 wt %, preferably 0.02 to 20 wt %, and more preferably 0.05 to 10 wt % with respect to the support powder. The support powder on which the transition metal is supported includes electrons at a concentration comparable to that in an initial stage even after the step of supporting the transition metal, and has a small work function when serving as the support. Therefore, the support powder exhibits high ability as an electron donor with respect to the transition metal and significantly promotes activation of nitrogen and hydrogen on the transition metal, thus functioning as a high-performance ammonia synthesis catalyst. The high performance is quite likely attributable to the fact that sufficient injection of electrons into the transition metal, which is closely contacted with the supporting surface of an electride, occurs upon dissociation of hydrogen and nitrogen. The catalyst of the present invention functions as a high-performance ammonia synthesis catalyst even when any of alkali metals, alkaline earth metals, and compounds thereof is not used as a promoter compound. However, such a promoter compound may be additionally used as required.

A similar supported metal catalyst can also be obtained by, instead of the above-described method, by mixing powder of the mayenite type compound including conduction electrons of $1\times10^{15}$ cm$^{-3}$ or more and powder of the transition metal compound in solid phase by a physical mixing process, and then heating the mixture under similar conditions to those described above for reductive decomposition of the transition metal compound into the transition metal.

Furthermore, the supported metal catalyst can also be prepared as a molded body by employing an ordinary molding technique. In practice, the molded body may take any of shapes of, e.g., a particle, a sphere, a tablet, a ring, a macaroni, a 4-leaf clover, a dice, and a honeycomb. As an alternative, the supported metal catalyst may be used in a state coated over a suitable support.

<Synthesis of Ammonia>

The ammonia synthesis method of the present invention is a method of using the above-described supported metal catalyst as a catalyst, and reacting hydrogen and nitrogen on the catalyst. A typical reaction process is to, as in the known Haber-Bosch process, directly react a gas mixture of nitrogen and hydrogen under heating and pressure, and to separate ammonia produced through the reaction of $N_2+3H_2\rightarrow 2NH_3$ by cooling the produced ammonia or absorbing the same with water. The nitrogen and hydrogen gases are supplied to be brought into contact with the supported metal catalyst set in a reactor vessel. The unreacted nitrogen and hydrogen gases are recycled to the reactor vessel after taking out the produced ammonia. Preferably, prior to supplying the nitrogen and hydrogen gases, a pretreatment for removing oxides, etc. attached to the supported transition metal through reduction is performed on the surface of the supported metal catalyst as reduction treatment using hydrogen gas or a gas mixture of hydrogen and nitrogen.

The mayenite type compound preferentially adsorbs water in atmospheric air and decomposes itself in the presence of excessive moisture. It is therefore desired that the ammonia synthesis reaction is developed in an atmosphere containing moisture as small as possible, i.e., by employing the nitrogen and hydrogen gases with moisture content of 100 ppm or less, preferably 50 ppm or less.

Ammonia is synthesized by heating the supported metal catalyst in an atmosphere of a gas mixture of nitrogen and hydrogen as starting materials. As conditions for the ammonia synthesis, a molar ratio of nitrogen to hydrogen is about 1/10 to 1/1, preferably 1/5 to 1/1. The reaction temperature is preferably not lower than 100° C. and lower than 600° C., more preferably in a range of about 200° C. or higher to about 500° C., and even more preferably in a range of about 250° C. or higher to about 500° C. A lower reaction temperature is advantageous in keeping equilibrium more satisfactory for the ammonia production. It is desired that the reaction temperature falls within the above-mentioned range from the viewpoint of obtaining a sufficient ammonia production rate and keeping equilibrium satisfactory for the ammonia production at the same time.

Reaction pressure of the gas mixture of nitrogen and hydrogen during the synthesis reaction is not limited to a particular level, but it is preferably 10 kPa to 30 MPa. From a practical point of view, the synthesis reaction is desirably carried out under pressurized condition, and a practically more preferably range of the reaction pressure is about 100 kPa to 30 MPa.

A reaction system may be any of a batch reaction mode, a closed circulatory reaction mode, and a flow reaction mode. From a practical point of view, however, the flow reaction system is most preferable. The ammonia synthesis reaction is advantageously carried out under condition of high pressure and low temperature in terms of equilibrium. Moreover, because of being an exothermic reaction, the ammonia synthesis reaction is advantageously developed while reaction heat is removed. Various contrivances are proposed to increase a yield from an industrial point of view. For example, when a flow reaction apparatus is used, a method for obtaining a high ammonia yield is proposed in which multiple reaction vessels filled with the catalyst are connected in series and an inlet temperature of each of the reaction vessels is lowered by installing an intercooler at an outlet of each reaction vessel for removal of heat. A method of employing a reaction vessel, which includes therein multiple catalyst layers filled with an iron catalyst and Ru-based catalyst, and finely controlling an outlet temperature of each reaction layer is also proposed.

In the present invention, ammonia can be synthesized by employing, as with known methods, one reaction vessel or multiple reaction vessels, each reaction vessel being filled with the catalyst. The catalyst used for the ammonia synthesis may be one of the catalysts of the present invention, a combination of two or more types selected from the catalysts of the present invention, or a combination of one or more of the catalysts of the present invention and one or more known catalysts. Any other suitable method, such as interconnecting multiple reaction vessels or employing a reaction vessel including multiple reaction layers in one vessel is further usable.

When catalysts are used in a combined manner in the present invention, the catalyst of the present invention is preferably used in the reaction vessel of final stage because it exhibits higher activity at lower temperature. Stated in another way, a higher ammonia yield can be obtained by carrying out a final reaction at such a low temperature that is advantageous from the viewpoint of equilibrium.

Under equilibrium reaction conditions for industrial ammonia synthesis, an ammonia concentration in reaction gas at the outlet of the reaction vessel is 20% or less due to equilibrium restrictions. Accordingly, after cooling and taking out the produced ammonia in the reaction gas, the unreacted starting materials are purged out of a system for recycle to be used again as the starting materials through the step of separating the reaction gas and a part of impurities contained in the unreacted starting materials.

The hydrogen as the starting material of the ammonia synthesis method may be any of hydrogen gases that are produced by various methods, e.g., a method of using coal, petroleum, or natural gas as a feedstock and producing hydrogen in a combination of a steam reforming process, partial oxidation reforming process, an autothermal reforming process, and a shift reaction, a method of using biomass as a feedstock, a method of electrolytically decomposing water, and a method of decomposing water with a photocatalyst.

When natural gas is used as the starting material for the ammonia synthesis method, hydrogen gas and nitrogen gas are produced through a steam reforming step and a partial oxidation reforming step both carried out on the natural gas, a CO shift reaction step, a $CO_2$ removing step, and a subsequent CO removing step with CO methanation. Because the steam reforming reaction is endothermic, reaction heat generated in an autothermal reaction is utilized. When air is used as a feedstock for the nitrogen gas, an H/N ratio is about 1.7 to 2.5 in molar ratio. Because the unreacted gas after the steam reforming step contains hydrogen gas, it is preferably cycled to the steam reforming step for reuse as recycle gas. A method of efficiently developing the reaction by controlling a ratio of fresh gas to the recycle gas is developed. Such a method can also be employed in the present invention in a similar way.

On the other hand, a method of using oxygen-enriched air is developed as a method for obtaining a starting material with a higher H/N ratio. Such a method is preferable from the viewpoint of energy because an amount of the recycle gas is reduced by employing the starting material with a higher H/N ratio. Furthermore, a method of separating air through compression, and then using oxygen in producing hydrogen by the autothermal process and using nitrogen as reaction gas or process nitrogen is a preferable method from the viewpoint of energy saving. Any of the above-mentioned methods can also be used as a starting-material production method in the present invention.

The present invention will be described in more detail below in connection with EXAMPLES. Ammonia synthesis activity was evaluated by quantitatively measuring a yield of $NH_3$ with gas chromatography, and determining an ammonia production rate.

EXAMPLE 1

Preparation of Mayenite Type Compound Including Conduction Electrons

Respective powders of $CaCO_3$ and $Al_2O_3$ were mixed with each other at a Ca to Al ratio of 11:7 and were heated at 1300° C. for 6 hours in an alumina crucible. Obtained powder was put in a silica glass tube and was heated at 1100° C. for 15 hours under vacuum of $1\times10^{-4}$ Pa. 3 g of powder thus obtained was sealed in a silica glass tube together with 0.18 g of metal Ca powder and was heated at 700° C. for 15 hours, thereby filling the interior of the tube with an atmosphere of metal Ca steam. As a result, powder of $C12A7:e^-$ having a conduction electron concentration of $2\times10^{21}$ cm$^{-3}$ (denoted by $C12A7e^{21}$) was obtained.

<Supporting of Ru on Support Powder>

1 g of $C12A7e^{21}$ powder obtained as described above was mixed in $Ru_3(CO)_{12}$ dissolved in a hexane solvent, and the solvent was evaporated for dryness. At that time, an amount of $Ru_3(CO)_{12}$ in the solvent was adjusted such that an amount of Ru supported on the $C12A7e^{21}$ powder was 6 wt % with respect to the $C12A7e^{21}$ powder. Obtained powder was heated at 100° C. for 4 hours under vacuum, whereby the remaining solvent component was removed and a catalyst precursor was formed. The catalyst precursor was then subjected to heat treatment at 400° C. for 3 hours in an atmosphere of hydrogen gas (26.7 kPa) for reduction of $Ru_3(CO)_{12}$. As a result, a supported metal catalyst made of electride (Ru/$C12A7e^{21}$) powder supporting the Ru metal was obtained. A BET surface area of the obtained catalyst was about 3 m$^2$g$^{-1}$.

<Ammonia Synthesis Reaction>

A reaction of reacting nitrogen gas ($N_2$) and hydrogen gas ($H_2$) and producing ammonia gas ($NH_3$) was carried out. The reaction was performed by putting 0.3 g of the catalyst obtained as described above in a U-shaped glass tube, and by attaching the U-shaped glass tube to a glass-made closed circulation system. The glass-made closed circulation system to which the U-shaped glass tube was attached had an inner volume of 200 ml. Before starting the reaction, pretreatment on the surface of Ru/$C12A7e^{21}$ was performed at 400° C. for 3 hours by introducing $H_2$ at 26.7 kPa to the closed circulation system. Thereafter, the reaction was developed at 400° C. by introducing $N_2$ at 6.7 kPa and $H_2$ at 20.0 kPa. The reaction was continued up to 4 hours, 8 hours, and 12 hours, and a yield of $NH_3$ was measured over time. Quantitative determination of the product was made by gas chromatography. A measured ammonia production rate is indicated in Table 1.

EXAMPLE 2

An ammonia synthesis reaction was carried out under the same conditions as those in EXAMPLE 1 except for using C12A7 having a stoichiometric composition and including conduction electrons of $1\times10^{19}$ cm$^{-3}$ (i.e., $C12A7e^{19}$). A measured ammonia production rate is indicated in Table 1.

COMPARATIVE EXAMPLE 1

An ammonia synthesis reaction was carried out under the same conditions as those in EXAMPLE 1 except for using C12A7 (non-doping) having a stoichiometric composition, but not including conduction electrons, instead of the electrically conductive mayenite type compound of EXAMPLE 1.

COMPARATIVE EXAMPLE 2

An ammonia synthesis reaction was carried out under the same conditions as those in EXAMPLE 1 except for using $\gamma$-$Al_2O_3$ (BET surface area of 170 m$^2$g$^{-1}$) instead of the electrically conductive mayenite type compound of EXAMPLE 1.

COMPARATIVE EXAMPLE 3

An ammonia synthesis reaction was carried out under the same conditions as those in EXAMPLE 1 except for using CaO (BET surface area of 4 m$^2$g$^{-1}$) instead of the electrically conductive mayenite type compound of EXAMPLE 1.

COMPARATIVE EXAMPLE 4

An ammonia synthesis reaction was carried out under the same conditions as those in EXAMPLE 1 except for using active carbon (BET surface area of 800 m$^2$g$^{-1}$) instead of the electrically conductive mayenite type compound of EXAMPLE 1. A measured ammonia production rate is indicated in Table 1.

TABLE 1

| Catalyst | | BET Surface Area ($m^2 \cdot g^{-1}$) | NH$_3$ Production Rate | |
|---|---|---|---|---|
| | | | $\mu mol \cdot g^{-1} \cdot h^{-1}$ | $\mu mol \cdot m^{-2} \cdot h^{-1}$ |
| EXAMPLE 1 | 6% Ru/C12A7e$^{21}$ | 3 | 500 | 167 |
| EXAMPLE 2 | 6% Ru/C12A7e$^{19}$ | 3 | 182 | 61 |
| COMPARATIVE EXAMPLE 1 | 6% Ru/C12A7: non-doping | 3 | 37 | 12 |
| COMPARATIVE EXAMPLE 2 | 6% Ru/ γ-Al$_2$O$_3$ | 170 | 33 | 0.19 |
| COMPARATIVE EXAMPLE 3 | 6% Ru/CaO | 4 | 13 | 3.3 |
| COMPARATIVE EXAMPLE 4 | 6% Ru/AC | 800 | 49 | 0.06 |

As seen from the ammonia production rates listed in Table 1, the catalysts supporting Ru on the support made of, e.g., γ-Al$_2$O$_3$, CaO, and active carbon (AC), have almost comparable performance to C12A7 (non-doping) supporting Ru. On the other hand, it is also seen that catalytic activity significantly increases as an amount of doped electrons increases, and that C12A7e$^{21}$ supporting Ru exhibits performance as high as about 10 times those of the existing catalysts. Such a high level of performance is quite likely attributable to the fact that sufficient injection of electrons into the Ru metal, which is closely contacted with the supporting surface of the electrode, occurs upon dissociation of hydrogen and nitrogen.

EXAMPLE 3

Figure 1:
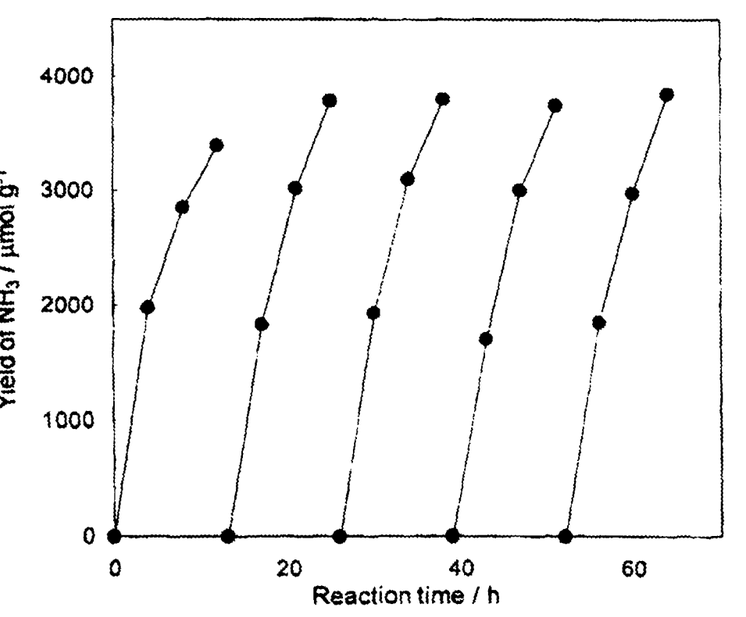
FIG. 1 is a time course (indicated by "Reaction time/h) of ammonia formation (indicated by "Yield of NH$_3$/µmolg$^{-1}$) when Ru/C12A7:e$^-$ (conduction electron concentration of $10^{21}$ cm$^{-3}$) in EXAMPLE 2 is repeatedly used in an ammonia synthesis reaction.

After continuing the synthesis reaction for ten and several hours under the same conditions as those in EXAMPLE 1, the reaction system was evacuated into a vacuum state. The synthesis reaction was then carried out again at 400° C. for ten and several hours by introducing N$_2$ at 6.7 kPa and H$_2$ at 20.0 kPa to the reaction system. Stability of the catalyst was evaluated by repeating the above-mentioned operations more three times. FIG. 1 plots the results of repeating the synthesis reaction by employing Ru/C12A7e$^{21}$ as the catalyst. Curves in FIG. 1 represent the results of the first, second, third, fourth and fifth synthesis reactions from the left side. As seen from FIG. 1, even after repeating the synthesis reaction five times, reduction of the catalytic activity does not appear at all, and all the synthesis reactions progress with the action of the catalyst. Thus, it is proved that the catalyst of the present invention does not deteriorate during the synthesis reaction and the catalyst remains stable even after long-time use.

EXAMPLE 4

An Ru supported catalyst was formed by, instead of the method of supporting Ru on the support powder in EXAMPLE 1, by physically mixing the support powder and Ru$_3$(CO)$_{12}$ by employing a ball mill without using a solvent, and then performing heat treatment on the mixture under vacuum at 450° C. for 2 hours. A similar result to that in EXAMPLE 1 was obtained when the ammonia synthesis reaction was carried out in the same manner as in EXAMPLE 1.

EXAMPLE 5

An ammonia synthesis reaction was carried out under the same conditions as those in EXAMPLE 1 except for using iron carbonyl instead of Ru$_3$(CO)$_{12}$ in EXAMPLE 1. A BET surface area of the catalyst made of the electride powder supporting Fe was about 3 $m^2g^{-1}$. An ammonia production rate was 38 $\mu molg^{-1}h^{-1}$ (13 $\mu molm^{-2}h^{-1}$). It was thus confirmed that the catalyst of EXAMPLE 5 was able to synthesize ammonia at lower temperature and lower pressure than the known catalysts using iron. Under the same reaction conditions set those in EXAMPLE 5, ammonia was not produced with the known catalysts made of calcium oxide, γ alumina, and carbon each supporting Fe.

EXAMPLE 6

Supporting of Ru on Support Powder 1 g of C12A7e$^{21}$ powder and 0.042 g of Ru$_3$(CO)$_{12}$ were put in a glass tube made of Pyrex (registered trademark), and the glass tube was sealed-off after evacuation. Heat treatment was performed on the mixture in accordance with the following program while the evacuated and sealed-off glass tube was rotated in an electric furnace.

[40° C., 20 min heat-up→40° C., 60 min hold→70° C., 120 min heat-up→70° C., 60 min hold→120° C., 120 min heat-up→120° C., 60 min hold→250° C., 150 min heat-up→250° C., 120 min hold]

Thereafter, the evacuated and sealed-off glass tube was broken, and an electride supporting 2 wt % of Ru (i.e., 2 wt % Ru/C12A7e$^{21}$) was obtained by performing heating-up to 300° C. in 5 hours and then heat treatment for 2 hours under an atmosphere of hydrogen gas (26.7 kPa).

<Ammonia Synthesis Reaction>

A reaction of reacting nitrogen gas (N$_2$) and hydrogen gas (H$_2$) and producing ammonia gas (NH$_3$) was carried out. The reaction was performed by putting 0.2 g of the catalyst obtained as described above in a quartz glass tube, and by attaching the quartz glass tube to a flow reaction apparatus. Reaction conditions were set such that a total gas flow rate was 60 mL/min, i.e., N$_2$: 15 mL/min and H$_2$: 45 mL/min, a pressure was the atmospheric pressure, and a reaction temperature was 400° C. The gas coming out from a reaction vessel in a flow system was bubbled in a sulfuric acid aqueous solution of 0.005 M, thus causing produced ammonia to be dissolved in the solution. Produced ammonia ions were quantitatively measured by ion chromatography. Obtained reaction results are indicated in Table 2.

<Calculation Method of TOF>

The term "turnover frequency (TOF)" implies a number representing, in a catalytic reaction, the number of times one active site has contributed to the reaction in average per unit time, and it is calculated by dividing the number of reacting molecules produced per unit time by the number of catalytic active sites. Because the active site is Ru in the catalytic reaction developed here, TOF is obtained by determining the number of Ru atoms exposed to the catalyst surface with CO adsorption, and dividing the number of ammonia molecules produced per unit time by the number of Ru atoms.

EXAMPLE 7

Supporting of Ru on Support Powder

A catalyst was synthesized under the same conditions as those in EXAMPLE 6 except for using 0.0105 g of Ru$_3$(CO)$_{12}$, and an electride supporting 0.5 wt % of Ru (i.e., 0.5 wt % Ru/C12A7e$^{21}$) was obtained.

<Ammonia Synthesis Reaction>

An ammonia synthesis reaction was carried out under the same conditions as those in EXAMPLE 6 except for using 0.5 wt % Ru/C12A7e$^{21}$. Obtained reaction results are indicated in Table 2.

EXAMPLE 8

Supporting of Ru on Support Powder

A catalyst was synthesized under the same conditions as those in EXAMPLE 6 except for using 0.0021 g of $Ru_3(CO)_{12}$, and an electrode supporting 0.1 wt % of Ru (i.e., 0.1 wt % Ru/C12A7e$^{21}$) was obtained.

<Ammonia Synthesis Reaction>

An ammonia synthesis reaction was carried out under the same conditions as those in EXAMPLE 6 except for using 0.1 wt % Ru/C12A7e$^{21}$. Obtained reaction results are indicated in Table 2.

COMPARATIVE EXAMPLE 5

An ammonia synthesis reaction was carried out under the same conditions as those in EXAMPLE 6 except for using C12A7 (non-doping) having a stoichiometric composition, but not including conduction electrons, instead of the electrically conductive mayenite type compound of EXAMPLE 6.

COMPARATIVE EXAMPLE 6

Ammonia synthesis reactions were carried out under the same conditions as those in EXAMPLES 6 to 8 except for using $\gamma$-$Al_2O_3$ (BET surface area of 170 m$^2$g$^{-1}$) supporting 6 wt % of Ru, instead of the electrically conductive mayenite type compounds of EXAMPLES 6 to 8.

COMPARATIVE EXAMPLE 7

Ammonia synthesis reactions were carried out under the same conditions as those in EXAMPLES 6 to 8 except for using CaO (BET surface area of 4 m$^2$g$^{-1}$) supporting 2 wt % of Ru, instead of the electrically conductive mayenite type compounds of EXAMPLES 6 to 8.

COMPARATIVE EXAMPLE 8

Ammonia synthesis reactions were carried out under the same conditions as those in EXAMPLES 6 to 8 except for using active carbon (BET surface area of 310 m$^2$g$^{-1}$) supporting 9.1 wt % of Ru and Ba (Ba/Ru=6.2), instead of the electrically conductive mayenite type compounds of EXAMPLES 6 to 8.

COMPARATIVE EXAMPLE 9

Ammonia synthesis reactions were carried out under the same conditions as those in EXAMPLES 6 to 8 except for using MgO (BET surface area of 12 m$^2$g$^{-1}$) supporting 6 wt % of Ru and Cs (Cs/Ru=1), instead of the electrically conductive mayenite type compounds of EXAMPLES 6 to 8.

TABLE 2

| Catalyst | | BET Surface Area (m$^2 \cdot$g$^{-1}$) | NH$_3$ Production Rate | | TOF (s$^{-1}$) |
|---|---|---|---|---|---|
| | | | $\mu$mol$\cdot$ g$^{-1}\cdot$h$^{-1}$ | $\mu$mol$\cdot$ m$^{-2}\cdot$h$^{-1}$ | |
| EXAMPLE 6 | 2 wt % Ru/C12A7e$^{21}$ | 1 | 2684 | 2684 | 0.191 |
| EXAMPLE 7 | 0.5 wt % Ru/C12A7e$^{21}$ | 1 | 969 | 969 | 0.258 |
| EXAMPLE 8 | 0.1 wt % Ru/C12A7e$^{21}$ | 1 | 582 | 582 | 0.131 |
| COMPARATIVE EXAMPLE 5 | 2 wt % Ru/C12A7: non-doping | 1 | 790 | 790 | 0.056 |
| COMPARATIVE EXAMPLE 6 | 6 wt % Ru/$\gamma$-Al$_2$O$_3$ | 170 | 52 | 0.3 | 0.0002 |
| COMPARATIVE EXAMPLE 7 | 2 wt % Ru/CaO | 4 | 158 | 39.5 | 0.005 |
| COMPARATIVE EXAMPLE 8 | 9.1 wt % Ru—Ba/Active carbon | 310 | 2417 | 7.8 | 0.003 |
| COMPARATIVE EXAMPLE 9 | 6 wt % Ru—Cs/MgO | 12 | 3107 | 259 | 0.008 |

As seen from the ammonia production rates listed in Table 2, the catalytic activity is greatly increased by modifying C12A7 (non-doping) into the electrode (C12A7e$^{22}$). Furthermore, comparing with 9.1 wt % Ru—Ba/Active carbon and 6 wt % Ru—Cs/MgO which are said as having the highest activity among the existing catalysts, it is seen that the activity of the electrode per unit weight is comparable in performance to those of the above-mentioned catalysts. Comparing the activity per unit surface area, because the surface area of the electrode is very small, i.e., 1 m$^2$/g, the electrode exhibits performance as high as about 10 times those of the existing catalysts. Moreover, comparing performance (TOF) per Ru active spot, it is apparent that the performance of the electrode is much superior to those of the other catalysts. Such a high level of performance is quite likely attributable to the fact that sufficient injection of electrons into the Ru metal, which is closely contacted with the supporting surface of the electrode, occurs upon dissociation of hydrogen and nitrogen.

EXAMPLE 9

Ammonia Synthesis Reaction

A reaction of reacting nitrogen gas (N$_2$) and hydrogen gas (H$_2$) and producing ammonia gas (NH$_3$) was carried out. The reaction was performed by putting 0.2 g of the catalyst (0.5 wt % Ru/C12A7e$^{21}$), synthesized in EXAMPLE 7, in a reaction tube made of stainless steel, and by attaching the reaction tube to a flow reaction apparatus. Reaction conditions were set such that a total gas flow rate was 60 mL/min, i.e., N$_2$: 15 mL/min and H$_2$: 45 mL/min, a pressure was 0.1 to 1.0 MPa, and a reaction temperature was 400° C. The gas coming out from a reaction vessel in a flow system was bubbled in a sulfuric acid aqueous solution of 0.005 M, thus causing produced ammonia to be dissolved in the solution. Produced ammonia ions were quantitatively measured by ion chromatography. Obtained reaction results are indicated in Table 3.

Table 3 indicates the catalytic activity of the Ru-supporting electrode when the pressure of the reaction gas was changed from 0.1 MPa to 1.0 MPa. The catalytic activity increases with an increase in the pressure, but it decreases when the pressure rises up to 0.7 MPa or 1 MPa. Such a result is quite likely attributable to an influence of hydrogen poisoning upon Ru as the active site. A further improvement of the catalytic activity is expected by changing a partial pressure of $N_2$.

TABLE 3

| Pressure (MPa) | $NH_3$ Production Rate ($\mu mol \cdot g^{-1} \cdot h^{-1}$) | TOF ($s^{-1}$) |
| --- | --- | --- |
| 0.1 | 732 | 0.195 |
| 0.3 | 790 | 0.211 |
| 0.5 | 840 | 0.224 |
| 0.7 | 776 | 0.207 |
| 1 | 722 | 0.193 |

EXAMPLE 10

Supporting of Fe on Support Powder 1 g of C12A7e[21] powder and 0.063 g of Fe(acac)$_3$ were put in a glass tube made of Pyrex (registered trademark), and the glass tube was sealed-off after evacuation. Heat treatment was performed on the mixture in accordance with the following program while the evacuated and sealed-off glass tube was rotated in an electric furnace.

[100° C., 120 min heat-up→100° C., 60 min hold→200° C., 120 min heat-up→200° C., 60 min hold→350° C., 150 min heat-up→300° C., 120 min hold]

Thereafter, the evacuated and sealed-off glass tube was broken, and an electride supporting 1 wt % of Fe (i.e., 1 wt % Fe/C12A7e[21]) was obtained by performing heating-up to 450° C. in 5 hours and then heat treatment for 2 hours while evacuation was continued.

<Ammonia Synthesis Reaction>

An ammonia synthesis reaction was carried out under the same conditions as those in EXAMPLE 6 except for using 1 wt % Fe/C12A7e[21]. A measured ammonia production rate is indicated in Table 4.

EXAMPLE 11

Supporting of Co on Support Powder 1 g of C12A7e[21] powder and 0.029 g of Co$_2$(CO)$_8$ were put in a glass tube made of Pyrex (registered trademark), and the glass tube was sealed-off after evacuation. Heat treatment was performed on the mixture in accordance with the following program while the evacuated and sealed-off glass tube was rotated in an electric furnace.

[100° C., 120 min heat-up→100° C., 60 min hold→200° C., 120 min heat-up→200° C., 60 min hold→350° C., 150 min heat-up→300° C., 120 min hold]

Thereafter, the evacuated and sealed-off glass tube was broken, and an electride supported 1 wt % of Co (i.e., 1 wt % Co/C12A7e[21]) was obtained by performing heating-up to 450° C. in 5 hours and then heat treatment for 2 hours while evacuation was continued.

<Ammonia Synthesis Reaction>

An ammonia synthesis reaction was carried out under the same conditions as those in EXAMPLE 6 except for using 1 wt % Co/C12A7e[21]. A measured ammonia production rate is indicated in Table 4.

COMPARATIVE EXAMPLE 10

An ammonia synthesis reaction was carried out by synthesizing a Fe-supported catalyst under the same conditions as those in EXAMPLE 10 except for using C12A7 (non-doping) having a stoichiometric composition, but not including conduction electrons, instead of the electrically conductive mayenite type compound of EXAMPLE 10.

COMPARATIVE EXAMPLE 11

An ammonia synthesis reaction was carried out by synthesizing a Co-supported catalyst under the same conditions as those in EXAMPLE 11 except for using C12A7 (non-doping) having a stoichiometric composition, but not including conduction electrons, instead of the electrically conductive mayenite type compound of EXAMPLE 11.

Table 4 indicates respective values of the catalytic activity of the electrides supported Fe and Co as metals other than Ru. As seen from Table 4, the catalysts obtained by supporting Fe and Co on C12A7e[21] having been doped with electrons exhibit the catalytic activity as high as 10 or more times that of the catalysts obtained by supporting Fe and Co on C12A7 (non-doping) without being doped with electrons. It is hence confirmed that injection of electrons into Fe and Co from the electrides is also effective.

TABLE 4

| | Catalyst | BET Surface Area ($m^2 \cdot g^{-1}$) | $NH_3$ Production Rate $\mu mol \cdot g^{-1} \cdot h^{-1}$ |
| --- | --- | --- | --- |
| EXAMPLE 10 | 1 wt % Fe/C12A7e[21] | 1 | 195 |
| EXAMPLE 11 | 1 wt % Co/C12A7e[21] | 1 | 430 |
| COMPARATIVE EXAMPLE 10 | 1 wt % Fe/C12A7: non-doping | 1 | 3 |
| COMPARATIVE EXAMPLE 11 | 1 wt % Co/C12A7: non-doping | 1 | 40 |

INDUSTRIAL APPLICABILITY

While high pressure of about 20 MPa or higher is required in the synthesis method (Haber-Bosch process), which is very often used in producing ammonia at present and which utilizes a doubly promoted iron catalyst primarily made of Fe$_3$O$_4$ and several weight percent of Al$_2$O$_3$ and K$_2$O, the method of the present invention can develop the synthesis reaction at comparatively low pressure without requiring high pressure. Thus, the method of the present invention can be said as being preferable from the viewpoint of simplifying a production process and saving energy consumption. In addition, the method of the present invention can produce ammonia at a cheaper cost and much higher efficiency than the methods using the known Ru catalysts.

The invention claimed is:

1. An ammonia synthesis method comprising the step of:
  reacting nitrogen and hydrogen as starting materials on a catalyst in a reaction apparatus under conditions of reaction temperature from 100° C. to 600° C. and reaction pressure of 10 kPa to 30 MPa,
  wherein the catalyst comprises:
    a metal catalyst; and
    a mayenite type compound including conduction electrons of $10^{15}$ cm$^{-3}$ or more, the mayenite type compound serving as a support for the metal catalyst.

2. An ammonia synthesis method comprising the step of:
  reacting nitrogen and hydrogen as starting materials on a catalyst in a reaction apparatus under conditions of reaction temperature from 100° C. to 600° C. and reaction pressure of 10 kPa to 30 Mpa, wherein the catalyst comprises:
a metal catalyst; and
a mayenite type compound including conduction electrons of $10^{15}$ cm$^{-3}$ or more, the mayenite type compound serving as a support for the metal catalyst, and
wherein the mayenite type compound is $12\text{CaO}\cdot7\text{Al}_2\text{O}_3$.

3. An ammonia synthesis method comprising the step of reacting nitrogen and hydrogen as starting materials on a catalyst in a reaction apparatus under conditions of reaction temperature from 100° C. to 600° C. and reaction pressure of 10 kPa to 30 Mpa,
wherein the catalyst comprises:
a metal catalyst; and
a mayenite type compound including conduction electrons of $10^{15}$ cm$^{-3}$ or more, the mayenite type compound serving as a support for the metal catalyst, and
wherein a metal of the metal catalyst is at least one selected from metal elements belonging to groups 6, 7, 8 and 9.

4. An ammonia synthesis method comprising the step of:
reacting nitrogen and hydrogen as starting materials on the catalyst in a reaction apparatus under conditions of reaction temperature from 100° C. to 600° C. and reaction pressure of 10 kPa to 30 Mpa,
wherein the catalyst comprises:
a metal catalyst; and
a mayenite type compound including conduction electrons of $10^{15}$ cm$^{-3}$ or more the mayenite type compound serving as a support for the metal catalyst, and
wherein the mayenite type compound take one of forms of powder, a porous material, a sintered body, a thin film, or a single crystal.

* * * * *